(12) United States Patent
Jin (10) Patent No.: US 8,336,082 B2
(45) Date of Patent: Dec. 18, 2012

(54) METHOD FOR REALIZING THE SYNCHRONOUS AUTHENTICATION AMONG THE DIFFERENT AUTHENTICATION CONTROL DEVICES

(75) Inventor: Tao Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1097 days.

(21) Appl. No.: 11/631,098

(22) PCT Filed: Dec. 13, 2005

(86) PCT No.: PCT/CN2005/002165
§ 371 (c)(1),
(2), (4) Date: Jan. 29, 2007

(87) PCT Pub. No.: WO2006/063511
PCT Pub. Date: Jun. 22, 2006

(65) Prior Publication Data
US 2007/0234038 A1    Oct. 4, 2007

(30) Foreign Application Priority Data
Dec. 13, 2004    (CN) .......................... 2004 1 0098489

(51) Int. Cl.
*H04L 29/06* (2006.01)
(52) U.S. Cl. ................ 726/3; 709/227; 700/295; 726/6; 713/155
(58) Field of Classification Search .................. 709/227; 700/295; 726/6; 713/155
See application file for complete search history.

(56) References Cited

U.S. PATENT DOCUMENTS
6,011,910 A * 1/2000 Chau et al. .................... 709/229
(Continued)

FOREIGN PATENT DOCUMENTS
| CN | 1553368 | 8/2004 |
|---|---|---|
| CN | 1553368 | 12/2004 |
| WO | WO2004/054302 | 6/2004 |

OTHER PUBLICATIONS

Miao Fuyou, The Network Authentication, Authorize and System of Accounting Method,(Foreign Translation of Aplication CN/03137267) Jun. 2, 2003.*

(Continued)

*Primary Examiner* — Jeffrey Pwu
*Assistant Examiner* — Michael D Anderson
(74) *Attorney, Agent, or Firm* — Staas & Halsey, LLP (57) ABSTRACT

A method for realizing the synchronous authentication among the different authentication control devices is provided. The user accesses the network and initiates the authentication by the slave authentication control device. Then the master authentication control device obtains the authentication information of the user from the slave authentication control device and transmits it to the master authentication server of the master authentication control device. Finally, the master authentication server performs the authentication process to the user according to the authentication information of the user. Therefore the accessing user can obtain the network authority of a plurality of service providers with only one logging on in the network in which a plurality of service providers are interconnected. The present invention facilitates the access to the network for the user and can assure that each service provider can control and manage the accessing user efficiently and thereby protects the benefit of the service providers.

8 Claims, 7 Drawing Sheets

U.S. PATENT DOCUMENTS

| | | | |
|---|---|---|---|
| 6,311,275 B1 | 10/2001 | Jin et al. | |
| 6,601,101 B1 * | 7/2003 | Lee et al. | 709/227 |
| 6,792,337 B2 * | 9/2004 | Blackett et al. | 700/295 |
| 7,136,999 B1 * | 11/2006 | Griffiths | 713/168 |
| 7,653,933 B2 * | 1/2010 | Miao | 726/4 |
| 7,855,956 B2 * | 12/2010 | Zhang | 370/230 |
| 2002/0037708 A1 | 3/2002 | McCann et al. | |
| 2003/0084282 A1 | 5/2003 | Taruguchi | |
| 2003/0120767 A1 * | 6/2003 | Morimoto | 709/223 |
| 2003/0147537 A1 | 8/2003 | Jing et al. | |
| 2004/0085942 A1 | 5/2004 | Le et al. | |
| 2005/0135625 A1 * | 6/2005 | Tanizawa et al. | 380/270 |

OTHER PUBLICATIONS

Rigney, et al., "Remote Authentication Dial in User Service (RADIUS)", Network working Group, RFC2865, pp. 1-68 (Jun. 2000).

Rigney, et al., "RADIUS Accounting", Network working Group, RFC2866, pp. 1-25, (Jun. 2000).

Rigney, et al., "RADIUS Extensions", Network working Group, RFC2869, pp. 1-42, (Jun. 2000).

Mamakos, et al., "A Method for Transmitting PPP Over Ethernet (PPPOE)", Network working Group, Request for Comments: 2516, pp. 1-16, (Feb. 1999).

Written Opinion of Int'l Searching Authority mailed in PCT/CN2005/002165 on Mar. 23, 2006.

First Chinese Office Action dated (mailed) Jul. 10, 2009, issued in related Chinese Application No. 200410098489.7 Huawei Technologies C., LTD.

Supplementary European Search Report dated (mailed) Jun. 20, 2007, issued in related Application No. EP20050818662 20051213, Hauwei Technologies Co., Ltd.

* cited by examiner

METHOD FOR REALIZING THE SYNCHRONOUS AUTHENTICATION AMONG THE DIFFERENT AUTHENTICATION CONTROL DEVICES

FIELD OF THE INVENTION

The present invention relates to the field of network authentication technology, particularly to a method for implementing synchronous authentication among different authentication control devices.

BACKGROUND OF THE INVENTION

There are a lot of different service providers such as operators, ISP (Internet Service Provider) and ICP (Internet Content Provider) in current communication networks, and each of the service providers can provide various services for the access users independently or cooperatively, and perform the authentication and accounting processing independently or cooperatively.

When they cooperate with each other, there are various corresponding cooperating modes, wherein the relatively typical cooperating mode is to implement the operation and the cooperation via exchanging the authentication and accounting information of the users among the AAA (Authentication, Authorization, and Accounting) systems.

Figure 1:
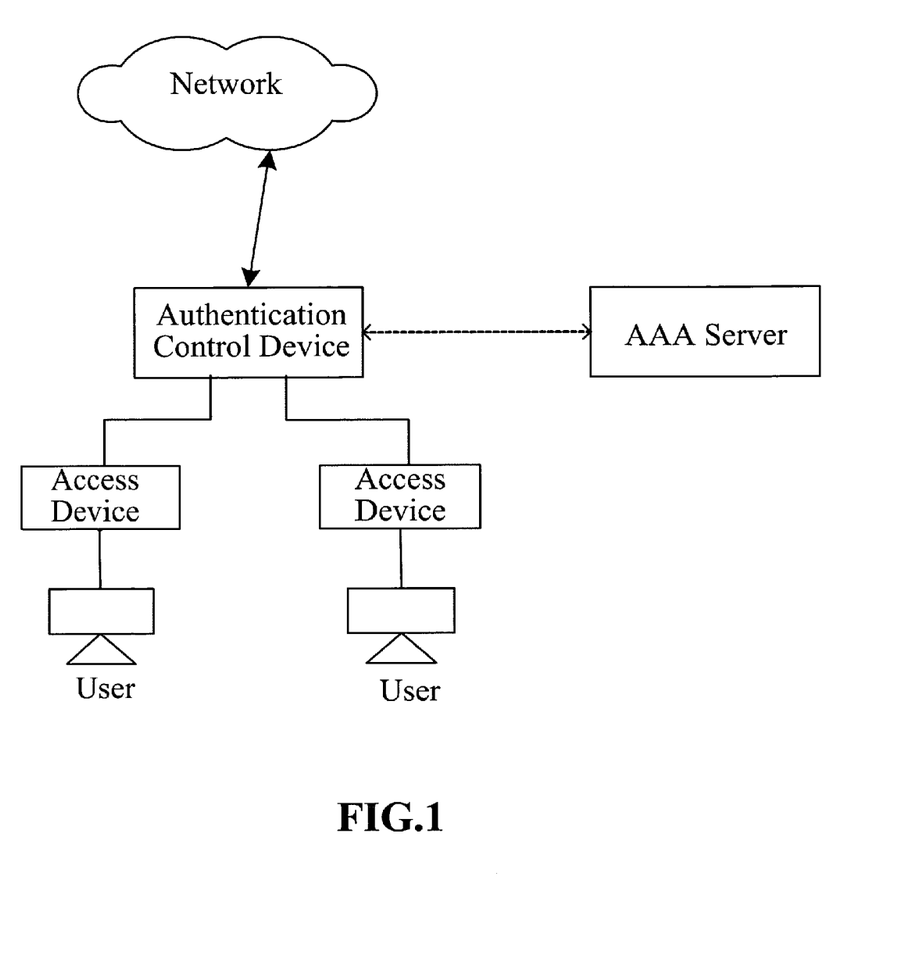
FIG. 1 is a diagram illustrating the conventional network architecture of the network with the AAA server.

The network architecture of the AAA system is shown in FIG. 1. When a user accesses the network via an access device, an authentication control device is responsible for carrying the identity information of the access user, and initiating the access and authentication processing for the access user toward an AAA server. There are a lot of generally adopted measures for the user authentication, such as PPPoE (Point-to-Point Protocol over Ethernet) authentication, WEB authentication and 802.1x authentication etc.

Figure 2:
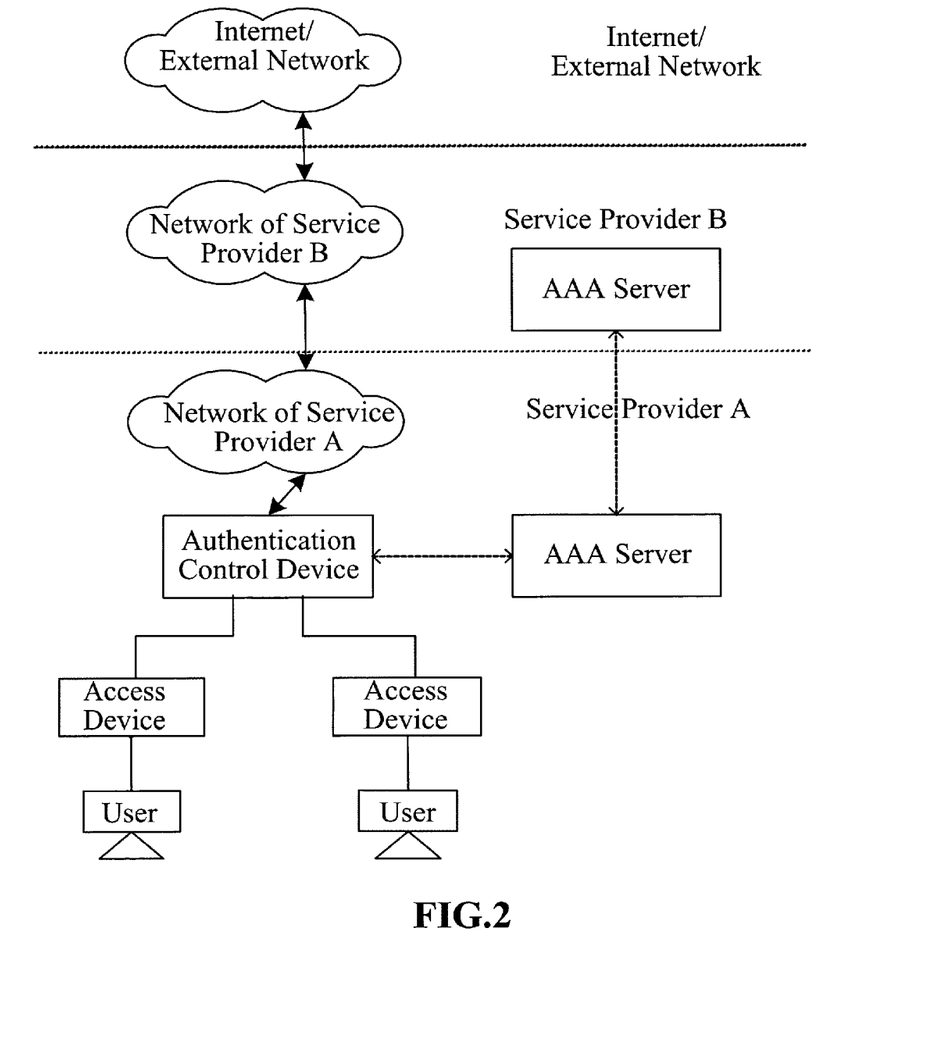
FIG. 2 is a conventional network architecture diagram I illustrating that a user initiates the authentication to multiple service providers in the prior art.
Figure 3:
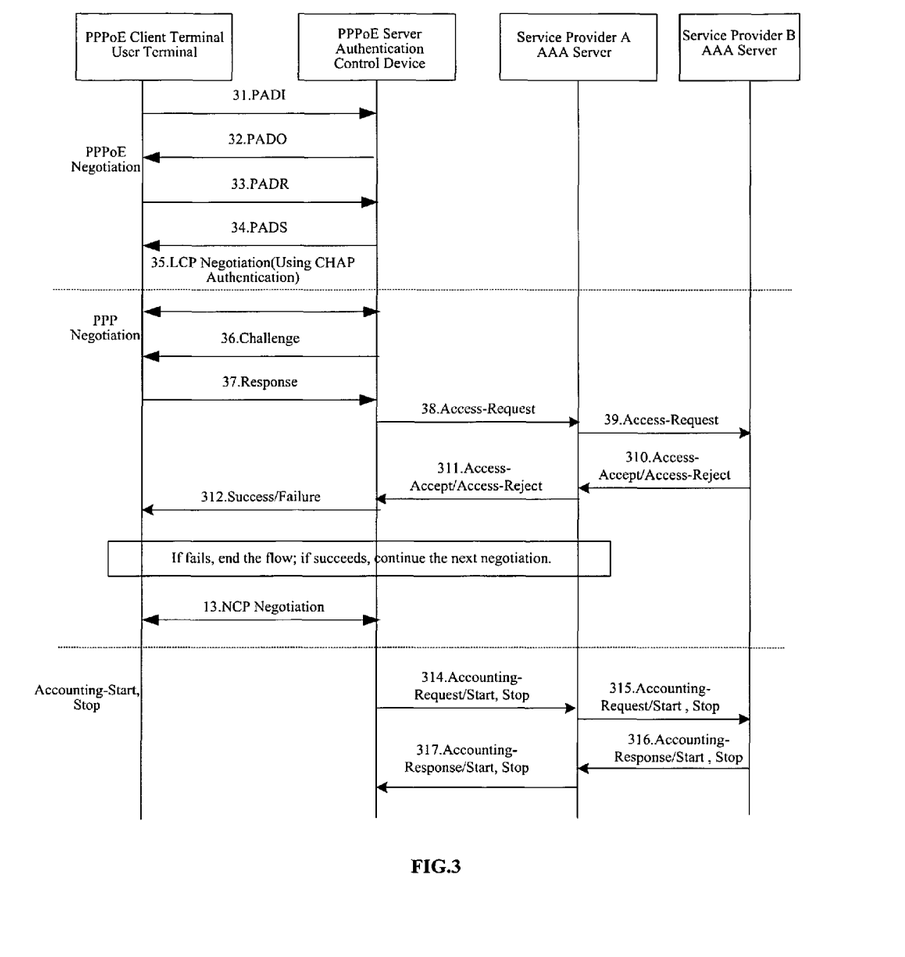
FIG. 3 is a flow chart illustrating the authentication processing performed by the network shown in FIG. 2.

The network architecture of a cooperating mode currently adopted among different service providers is shown in FIG. 2, and taking the PPPoE access authentication as example, the detailed authentication processing flow for the access user in the network shown in FIG. 2 is shown in FIG. 3, including the following steps:

Step 31: a user terminal sends a PADI message, i.e. a PPPoE Active Discovery Initiation message, to an authentication control device (i.e. PPPoE server) to start a PPPoE access;

Step 32: the authentication control device (PPPoE server) sends a PADO message, i.e. a PPPoE Active Discovery Offer message, to the user terminal;

Step 33: the user terminal initiates a PADR request (a PPPoE Active Discovery Request message) to the authentication control device (PPPoE server) according to the PADO message responded by the authentication control device;

Step 34: the authentication control device (PPPoE server) generates a session id (session identifier), and sends it to the user terminal via PADS (PPPoE Active Discovery Session message);

Step 35: the user terminal and the authentication control device (PPPoE server) perform a PPP LCP (Link Control protocol) negotiation to establish link layer communication and synchronously negotiate for using a CHAP (Challenge Handshake Authentication Protocol) authentication mode;

Step 36: the authentication control device (PPPoE server) sends and provides a Challenge (challenge code) of 128 bits to the authentication user terminal via a Challenge message;

Step 37: after receiving the Challenge message, the user terminal makes an MD5 algorithm encryption for a password and the Challenge message and then sends the encrypted Challenge-Password and challenge message in a Response message to the authentication control device (PPPoE server);

Step 38: the authentication control device (PPPoE server) sends the encrypted Challenge message and Challenge-Password and the username to a RADIUS (Remote Authentication Dial in User Service) user authentication server of service provider A for authentication;

Step 39: If the RADIUS user authentication server of service provider A recognizes that it is a user of service provider B according to the username, forward the authentication message to the RADIUS user authentication server of service provider B for real authentication;

That is, the authentication server of service provider A sends an Access-Request message to the authentication server of service provider B;

Step 310: the RADIUS user authentication server of service provider B determines whether the user is legal according to the user information, and then responds with an authentication Success/Failure message to the RADIUS user authentication server of service provider A;

That is, the authentication server of service provider B sends an Access-Accept/Access-Reject message to the authentication server of the service provider A;

Step 311: the RADIUS user authentication server of service provider A forwards the authentication Success/Failure message to the authentication control device (PPPoE server); if succeeds, carry the negotiation parameter and the user's relevant service attribute to authorize the user; after obtaining the user authorization, the authentication control device (PPPoE server) can perform various control and management on the user network; if fails, the flow is ended here.

Step 312: the authentication control device (PPPoE server) returns an authentication result (i.e. Success/Failure) to the user terminal; if the authentication is successful, continue to execute step 313, or else the flow is ended here;

Step 313: the user terminal conducts an NCP (Network Control Protocol) negotiation such as IPCP (IP Control Protocol) protocol etc, and obtains, via the authentication control device (PPPoE server), parameters such as the planning IP address;

Step 314: if the authentication is successful, the authentication control device (PPPoE server) initiates an Accounting-Start request to the RADIUS user accounting server of service provider A;

The authentication control device can send accounting/start/stop message to service provider A, that is, the Accounting-Response/Start/Stop message;

Step 315: if the RADIUS user accounting server of service provider A discovers that the user is a roaming user whose service provider is service provider B, forward the accounting message to the RADIUS user accounting server of service provider B for real accounting;

Step 316: the RADIUS user accounting server of service provider B responds with an Accounting-Accept message to the RADIUS user accounting server of service provider A; and Step 317: the RADIUS user accounting server of service provider A forwards the Accounting-Accept message to the authentication control device (PPPoE server).

Here the access user passes the authentication, and obtains the legal authority, and can launch its network service normally.

When the user wants to terminate the network service, it can cut off the network connection via PPPoE; specifically, it can send an Accounting-Stop message in the message format transmitted in step 314 to step 317, so as to implement the Accounting-Stop processing.

Via the above processing, the mutual communication of the authentication and accounting information is implemented between service provider A and service provider B. However, because the core devices for authentication and accounting (i.e. the authentication control device) are in the network of service provider A and meanwhile the AAA information is forwarded from the AAA server of service provider A to the AAA server of service provider B, actually the control right on the users is completely held by service provider A. Therefore, if service provider A modifies the parameters of the authentication control device and the AAA server, there is a great possibility that service provider B will suffer losses.

Figure 4:
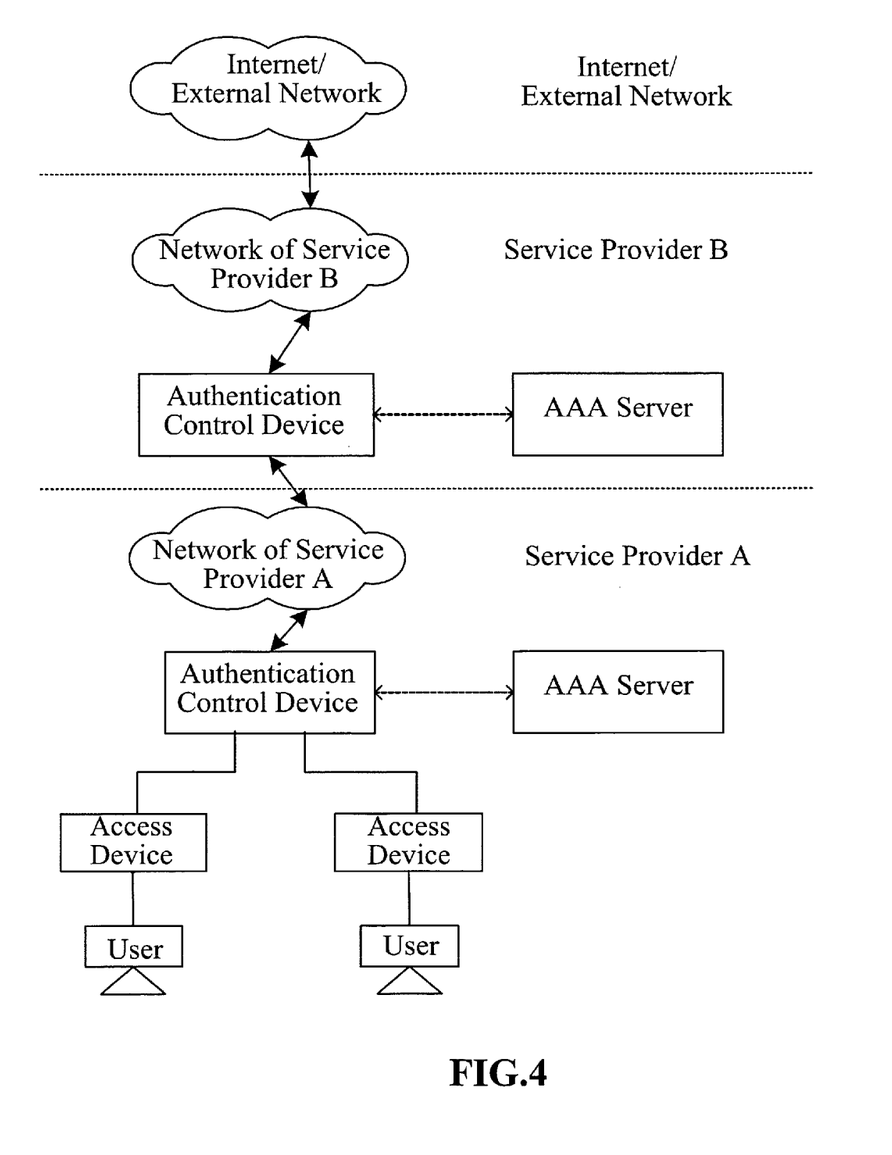
FIG. 4 is a conventional network architecture diagram II illustrating that a user initiates the authentication to multiple service providers in the prior art.
Figure 5:
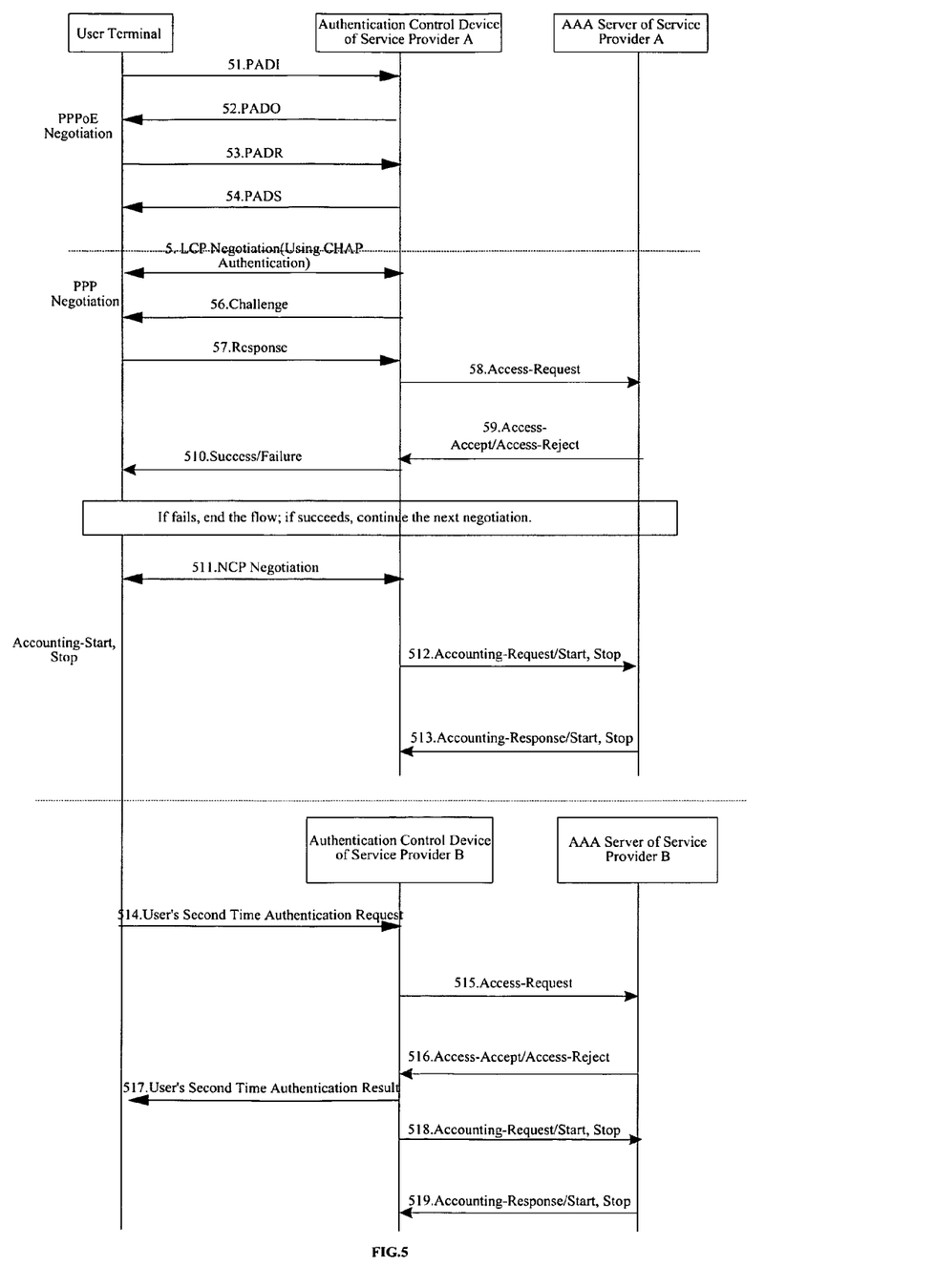
FIG. 5 is a flow chart illustrating the authentication processing performed by the network shown in FIG. 4.

To avoid occurrence of the case that the controlled service provider suffers possible losses due to the inequitable status among different service providers, now each service provider needs to set and apply its own authentication control device. The corresponding network architecture is shown in FIG. 4. Still taking the PPPoE access authentication mode as example, here gives the description of the authentication processing flow for the access user in FIG. 4 with reference to FIG. 5, and the corresponding processing flow includes:

The processing procedure from Step 51 to Step 58 is the same as that from step 31 to step 38 shown in FIG. 3, and therefore detailed description is omitted;

Step 59: the RADIUS user authentication server of service provider A determines whether or not the user is legal according to the user information, and then executes step 510 by responding with the authentication Success/Failure message to the authentication control device;

If succeeds, carry the negotiation parameter and the user's relevant service attribute to authorize the user, and executes step 511; after obtaining the user authorization, the authentication control device (PPPoE server) can perform various control and management on the user network; if fails, the flow is ended here.

Step 511: the user terminal conducts an NCP (such as IPCP) negotiation, and obtains, via the authentication control device (PPPoE server), parameters such as the planning IP address;

Step 512: if the authentication is successful, the authentication control device (PPPoE server) initiates an Accounting-Start request to the RADIUS user accounting server of service provider A;

Step 513: the RADIUS user accounting server of service provider A responds with an Account-Accept message to the authentication control device (PPPoE server).

Here, the access user passes the authentication, and obtains the legal authority, and can launch its network service normally. However, because the user does not get the authorization of service provider B, it can only visit the network of service provider A. Thus, when the user wants to visit service provider B and external networks, the user needs to be re-authenticated by service provider B. That is, the user terminal initiates a secondary authentication request for the authentication control device of service provider B, and generally the WEB authentication mode is adopted currently. The detailed authentication processing procedure is also shown in FIG. 5, and includes:

Step 514: the authentication control device of service provider B sends the user information to the RADIUS user authentication server of service provider B for authentication;

Step 515: the RADIUS user authentication server of service provider B determines whether or not the user is legal according to the user information, and then execute step 516, that is, responding with the Authentication Success/Failure message to the authentication control device of service provider B;

If succeeds, carry the negotiation parameter and the user's relevant service attribute to authorize the user; after obtaining the user authorization, the authentication control device (PPPoE server) can perform the various control and management on the user network; if fails, the flow is ended here.

Step 517: the authentication control device of service provider B returns the authentication result to the user terminal, and if the authentication is successful, continue to execute step 518;

Step 518: the authentication control device of service provider B initiates an Accounting-Start request for the RADIUS user accounting server of service provider B;

Step 519: the RADIUS user accounting server of service provider B responds with an Accounting-Accept message to the authentication control device of service provider B;

Here, the access user has passed the authentication, and obtained the legal authority of the network of service provider B/the external network, and can launch its network service normally. That is, if the user passes the authentication twice, it can visit service provider A, service provider B and the external network.

In this solution, if there are multiple service providers, the user needs to be authenticated for many times to obtain the authority layer by layer. That is, the user is required to login for each service provider, which makes the user's operation procedure complicated. Furthermore, each service provider maintains its operation information individually, thus making the operation cost of the service provider increased greatly.

SUMMARY OF THE INVENTION

Embodiments of the present invention provide a method for implementing synchronous authentication among different authentication control devices, which simplifies the login and authentication procedure when the user accesses the network, and guarantees the reliable control and management of the access user by each service provider.

The embodiments of the present invention are implemented by the following technical solution A method for implementing synchronous authentication among different authentication control devices in an embodiment of the present invention, includes:

a user accessing a network, and initiating an authentication via a slave authentication control device;

a master authentication control device acquiring the user's authentication information from the slave authentication control device, and sending the user's authentication information to a master authentication server of the master authentication control device;

the master authentication server performing authentication processing of the user according to its authentication information.

It can be seen from the technical solution provided by the embodiments of the present invention described above that in the network where multiple service providers are connected with each other according to the embodiment of the present invention, the access user can obtain the network authority of multiple service providers by logining only once, which brings great convenience for the user to access the network.

Furthermore, the embodiments of the present invention can guarantee that each service provider controls and manages the access user effectively, so as to protect the interest of the service provider effectively.

In addition, the embodiments of the present invention also bring the result that each service provider needs to configure the system only once when it is installed, without the necessity of providing additional maintenance for the authentication control device and the AAA server etc. As for an individual user, all the service providers need to be maintained only once, that is, the user information needs to undergo establishment, modification, deletion and various maintenance operation only once, which is not the same as the solution provided by the prior art that each service provider needs to be maintained once respectively.

DETAILED DESCRIPTION OF THE EMBODIMENTS

The embodiments of the present invention show that when a user of those service providers which cooperate with each other accesses the network, an authentication processing procedure is initiated to the authentication control device of each service provider at the same time based on the identifier information of the access user. Accordingly, the user of different service providers which are in cooperation with each other in the network can finish, at one time, the access and authentication processing procedures of different service providers, thus guaranteeing the operating interest of each service provider adequately.

Figure 6:
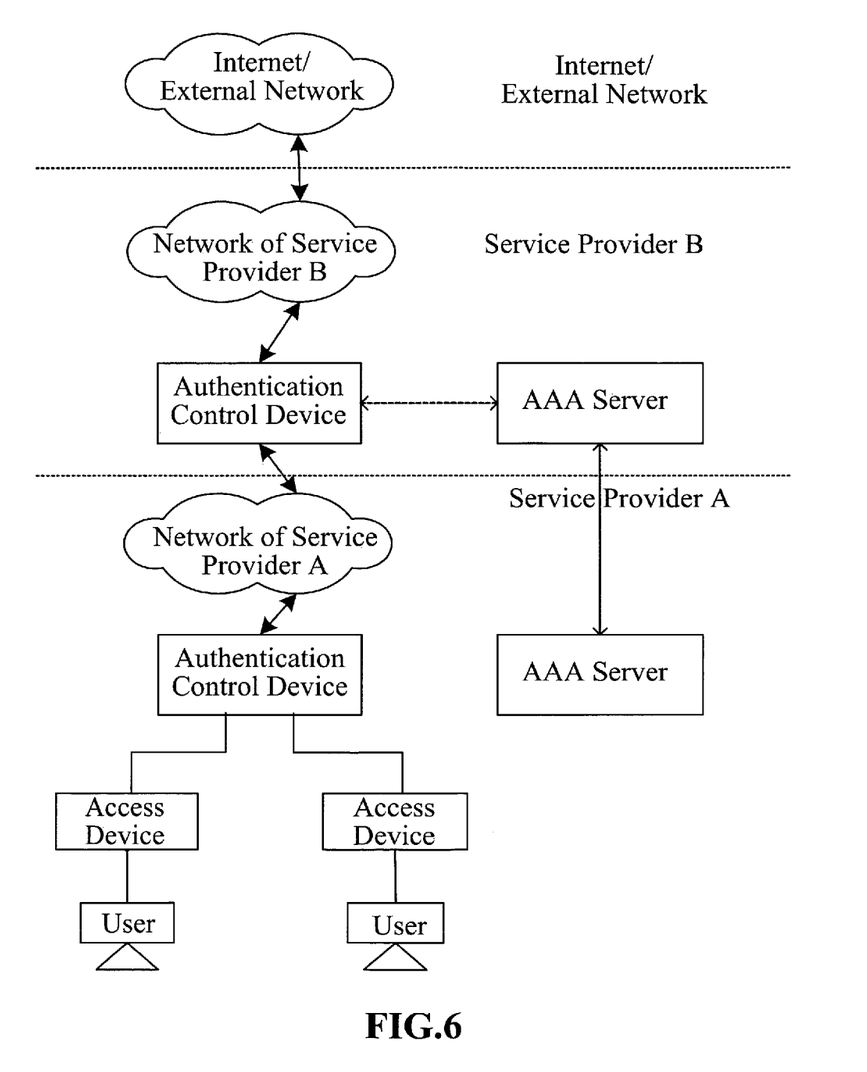
FIG. 6 is a network architecture diagram illustrating that a user initiates the authentication to multiple service providers in an embodiment of the present invention.

In the method of the embodiments of the present invention, each service provider has their respective independent authentication control device, as shown in FIG. 6; and all the authentication control devices can configure their own AAA servers correspondingly. In the embodiments of the present invention, an authentication control device in the network connected directly to the external network is called master authentication control device, such as the authentication control device of service provider B in FIG. 6; an authentication control device in other networks connected to the external network via the network connected directly to the external network is called slave authentication control device, such as the authentication control device of service provider A in FIG. 6.

In the embodiments of the present invention, all authentication information of the users who have gained access to each master or slave authentication control device is stored in the master authentication server to which the master authentication control device corresponds, and the master authentication server is, for example, the AAA (Authentication, Authorization, and Accounting) server and the corresponding RDIUS user authentication server of service provider B in FIG. 6; alternatively, the authentication information may be stored in the slave authentication server to which each slave authentication control device corresponds, and the slave authentication server is, for example, the AAA (Authentication, Authorization, and Accounting) server and the corresponding RDIUS user authentication server of service provider A in FIG. 6.

Figure 7:
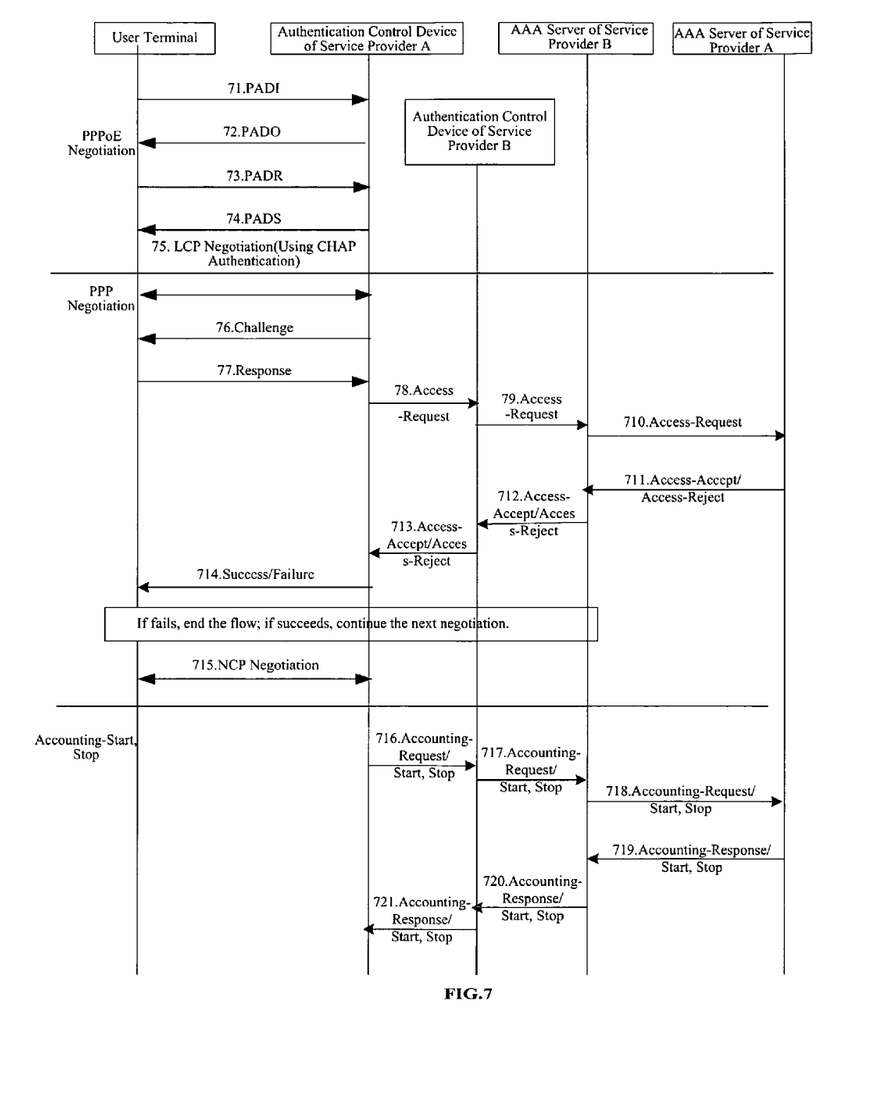
FIG. 7 is a flow chart illustrating the authentication processing performed by the network shown in FIG. 6.

Taking the network architecture shown in FIG. 6 as example, the embodiment of the method of the present invention is shown in detail in FIG. 7, including the following steps:

Step 71: a user terminal sends a PADI message to an authentication control device (i.e. PPPoE server) of service provider A to start a PPPoE access;

Step 72: after receiving the PADI message, the authentication control device sends a PADO message to the user terminal;

Step 73: the user terminal sends a PADR request to the authentication control device according to the PADO message responded by the authentication control device;

Step 74: the authentication control device generates a session id (session identifier), and sends it to the user terminal via a PADS message;

Step 75: the user terminal and the authentication control device perform a PPP LCP (Link Control protocol) negotiation to establish link layer communication and synchronously negotiate for using the CHAP authentication mode;

Step 76: the authentication control device sends and provides a Challenge of 128 bit to the authentication user terminal via a Challenge message;

Step 77: after receiving the Challenge message, the user terminal makes an MD5 algorithm encryption for a password and the Challenge message and then sends the encrypted Challenge-Password and Challenge message in a Response message to the authentication control device of service provider A;

The processing procedure for the user access from step 71 to step 77 is completely the same as the corresponding processing procedure in the prior art.

Step 78: after receiving the authentication information, the authentication control device of service provider A sends the user identity information (i.e. the authentication information) such as a Challenge, a Challenge-Password and the username to the authentication control device of service provider B, i.e. the master authentication control device;

Step 79: the authentication control device of service provider B sends the user identity information to the RADIUS user authentication server of service provider B for authentication; the RADIUS user authentication server and the corresponding AAA server of service provider B are called master authentication server;

If the user identity information is stored in the AAA server of service provider B, the RADIUS user authentication server of service provider B determines whether the user is legal according to the user identity information, and execute step 712; if the user identity information is stored in the AAA server of service provider A, execute step 710.

Step 710: the RADIUS user authentication server of service provider B forwards the user information to the RADIUS user authentication server of service provider A;

Step 711: the RADIUS user authentication server of service provider A determines whether or not the user is legal according to the user information, and then responds with an authentication Success/Failure message;

If succeeds, carry the negotiation parameter and the user's relevant service attribute to authorize the user;

Step 712: return the authentication Success/Failure message to the authentication control device of service provider B;

If skip from step 79 to this step, the RADIUS user authentication server of service provider B determines whether or not the user is legal according to the user information, and then responds with the authentication Success/Failure message; if succeeds, carry the negotiation parameter and the use's relevant service attribute to authorize the user;

If skip from step 711 to this step, the RADIUS user authentication server of service provider B forwards the message sent from the RADIUS user authentication server of service provider A to the authentication control device of service provider B; if the RADIUS server of service provider B contains the user information, authenticate directly and return the result;

Step 713: after receiving the authentication Success/Failure message, if the user authorization is obtained successfully, the authentication control device of service provider B performs various control and management on the network of service provider B, and synchronously forwards the message to the authentication control device of service provider A; for example, if the authentication is successful and the authorization is obtained, the authentication control device of service provider B can manage the user and the traffic which enter the network of service provider B; however, if the authentication fails, the user can not enter the network of service provider B via the authentication control device of service provider B;

Step 714: after receiving the message, if the user authorization is obtained successfully, the authentication control device of service provider A performs various control and management on the network of service provider A, and synchronously, the authentication control device of service provider A returns the authentication result to the user terminal;

After the user terminal receives the message, if the authentication fails, the flow is ended here, or else continue to execute step 715.

Step 715: the user terminal conducts an NCP (such as IPCP) negotiation, and obtains, via the authentication control device of service provider A, the parameters such as the planning IP address etc.

Step 716: if the NCP negotiation is successful, the authentication control device of service provider A initiates an Accounting-Start request to the authentication control device of service provider B, that is, sending the accounting information to the authentication control device;

Step 717: the authentication control device of service provider B forwards the request to the RADIUS user accounting server of service provider B;

If service provider A needs no accounting information, execute step 720 directly, or else execute step 718;

Step 718: the RADIUS user accounting server of service provider B forwards the request to the RADIUS user accounting server of service provider A;

Step 719: the RADIUS user accounting server of service provider A responds with an Accounting-Accept message to the RADIUS user accounting server of service provider B;

Step 720: if skip from step 717 to this step, the RADIUS user accounting server of service provider B responds with the Accounting-Accept message to the authentication control device of service provider B; and If skip from step 719 to step 720, forward the received Accounting-Accept message to the authentication control device of service provider B.

Step 721: the authentication control device of service provider B forwards the Accounting-Accept message to the authentication control device of service provider A;

Here, the access user passes the authentication, and obtains the legal access authority of service provider A, service provider B and the external network, and can launch its network service normally.

In the embodiments of the present invention, when the user wants to terminate the network service, it can cut off the network connection also via PPPoE server (the authentication control device), that is, sending the corresponding Accounting-Stop message according to the message format transmitted from step 716 to step 721, so as to stop the corresponding accounting procedure.

In the accounting procedure, the embodiments of the present invention also can adopt the accounting processing mode that the authentication control device of service provider A does not provide the accounting information and the accounting information is provided only by the authentication control device of service provider B. That is, step 716 and step 721 are omitted in FIG. 7. If the accounting is performed by only service provider B and service provider A trusts this, the accounting needs to be performed only once; only in the distrust case, the accounting needs to be performed by both service providers A and B, and then to be checked.

The embodiments of the present invention are applicable not only to PPPoE, but also to all the other authentication modes. Besides the RADIUS, the AAA protocol may include DIAMETER (a new AAA protocol) and TACACS (Terminal Access Controller Access Control System, an AAA protocol) etc.

Because the authentication control device of service provider B is required to synchronize the authentication and accounting information with that of the authentication control device of service provider A, the authentication control device of service provider B must acquire the authentication information of the authentication control device of service provider A.

Currently, there are mainly two adoptable acquisition modes: one is the mode of detecting the data message which bears the authentication information, and another is the mode of setting the master authentication control device as a proxy server of the slave authentication control device. The following gives the explanation of these two modes:

(1) The mode of detecting the data message: in this mode, it is required that the authentication request message (such as RADIUS request message) initiated by the authentication control device of service provider A must be transmitted through the authentication control device of service provider B; in this way, the authentication control device of service provider B can detect all the data message; practically, it also can be configured to detect the specified message or the message of the specified AAA server; generally, the detected message is stored at first, and then forwarded; on the other hand, it also can be repackaged and then forwarded as required;

(2) The mode of setting the master authentication control device as a proxy server: the authentication control device of service provider A takes the authentication control device of service provider B as a RADIUS Server, and all the messages are sent directly to the RADIUS port of the authentication control device of service provider B; the authentication control device of service provider B functions as a standard RADIUS Proxy to receive, modify, and send the authentication message; generally the RADIUS proxy needs to repackage the message and then forward the repackaged message, but the RADIUS proxy also can store the received message and forward the stored message directly.

Because the authentication control device of service provider B and the authentication control device of service provider A have synchronized the authentication and accounting information and all the user authentication and authorization information are stored in all the authentication control devices, the embodiments of the present invention enable the user to obtain the legal network authority of multiple service providers by inputting the username and the password only once.

In the practical applications, the embodiments of the present invention can be extended to the interconnections among multiple service providers, so as to realize the synchronous authentication among multiple authentication control devices.

The above is just the preferred embodiments of the present invention, and the scope of the present invention is not limited thereto. Those skilled in the art shall appreciate that various changes or variations can be made within the scope of the present invention. Thus, the scope of the present invention should be defined by the claims.

I claim:

1. A method for implementing synchronous authentication among different authentication control devices, comprising:
   receiving, by a slave authentication control device, authentication information of a user;
   acquiring, by a master authentication control device, the authentication information of the user from the slave authentication control device;
   sending, by the master authentication control device, the authentication information of the user to a master authentication server of the master authentication control device;
   if the authentication information of the user is stored in the master authentication server:
      performing, by the master authentication server, an authentication process of the user after receiving the authentication information of the user;
      returning, by the master authentication server, an authentication Success or Failure message to the master authentication control device; and
      forwarding, by the master authentication control device, the authentication Success or Failure message to the slave authentication control device;
   if the authentication information of the user is stored in the slave authentication server:
      sending, by the master authentication server, the authentication information of the user to the slave authentication server;
      performing, by the slave authentication server, an authentication process of the user according to the authentication information of the user;
      sending, by the slave authentication server, an authentication Success or Failure message to the master authentication server;
      forwarding, by master authentication server, the authentication Success or Failure message to the master authentication control device; and
      forwarding, by the master authentication control device, the authentication Success or Failure message to the slave authentication control device.

2. The method for implementing synchronous authentication among different authentication control devices according to claim 1, wherein the steps of acquiring the authentication information of the user from the slave authentication control device, and sending the authentication information of the user to the master authentication server of the master authentication control device comprises:
   detecting, by the master authentication control device, a message bearing the authentication information of the user sent by the slave authentication control device;
   acquiring, by the master authentication control device, the message; and
   forwarding, by the master authentication control device, the message to the master authentication server directly or after repackaging it.

3. The method for implementing synchronous authentication among different authentication control devices according to claim 1, wherein the steps of acquiring the authentication information of the user from the slave authentication control device, and sending the authentication information of the user to the master authentication server of the master authentication control device comprises:
   sending, by the slave authentication control device, the authentication information of the user to the master authentication control device, and
   forwarding, by the master authentication control device, the authentication information of the user to the master authentication server directly or after repackaging it.

4. The method for implementing synchronous authentication among different authentication control devices according to claim 1, wherein the method further comprises:
   acquiring, by the master authentication server, accounting information from the master authentication control device, and
   performing, by the master authentication server, the accounting to the access user according to the accounting information.

5. The method for implementing synchronous authentication among different authentication control devices according to claim 4, wherein the steps of acquiring accounting information from the master authentication control device, and performing the accounting to the access user according to the accounting information further comprises:
   sending, by the slave authentication control device, the accounting information to the master authentication server via the master authentication control device, and
   performing, by the master authentication server, the accounting according to the accounting information.

6. The method for implementing synchronous authentication among different authentication control devices according to claim 4, wherein the steps of acquiring accounting information from the master authentication control device, and performing the accounting to the access user according to the accounting information further comprises:
   sending, by the master authentication server, the accounting information to the slave authentication server, and
   performing, by the slave authentication server, the accounting according to the accounting information.

7. A system for implementing synchronous authentication among different authentication control devices, comprises:
   a master authentication control device;
   a master authentication server corresponding to the master authentication control device;
   a slave authentication control device; and
   a slave authentication server corresponding to the slave authentication control device,
   wherein:
   the slave authentication control device is configured to receive authentication information of a user;
   the master authentication control device is configured to acquire the authentication information of the user from the slave authentication control device and send the authentication information of the user to the master authentication server;

if the authentication information of the user is stored in the master authentication server:

the master authentication server is configured to perform an authentication process of the user after receiving the authentication information of the user and return an authentication Success or Failure message to the master authentication control device; and the master authentication control device is further configured to forward the authentication Success or Failure message to the slave authentication control device;

if the authentication information of the user is stored in the slave authentication server:

the master authentication server is configured to send the authentication information of the user to the slave authentication server;

the slave authentication server is configured to perform an authentication process of the user according to the authentication information of the user and send an authentication Success or Failure message to the master authentication server;

the master authentication server is further configured to forward the authentication Success or Failure message to the master authentication control device; and the master authentication control device is further configured to forward the authentication Success or Failure message to the slave authentication control device.

8. The system of claim 7, the master authentication server is further configured to acquire accounting information from the master authentication control device, and perform accounting to the user according to the accounting information.

* * * * *